Dec. 26, 1950          H. A. LEBERT          2,535,079

METHOD OF UPSETTING A HOLLOW RIVET

Filed May 2, 1944

Inventor:
Herbert A. Lebert

Patented Dec. 26, 1950

2,535,079

UNITED STATES PATENT OFFICE 2,535,079

METHOD OF UPSETTING A HOLLOW RIVET

Herbert A. Lebert, Cheyenne, Wyo., assignor to United Air Lines, Inc., Chicago, Ill., a corporation of Delaware Application May 2, 1944, Serial No. 533,781

3 Claims. (Cl. 218—29)

This invention relates to methods of setting hollow rivets and has particular relation to methods in which the setting operation is accomplished by hydraulic pressure transmitted to the interior of the rivet through a body of fluid or fluidic material.

Rivets of this general class are formed with internal chambers or cavities for receiving hydraulic fluid or the like under pressure. Such a chamber or cavity may be provided by axially boring a solid rivet from the head end thereof to a depth extending well into the shank portion of the rivet but not reaching the end of the shank. A cavity which is closed except for the head-end opening is thus provided within the rivet, including the shank portion thereof. This cavity or a substantial portion thereof is filled with a body of material capable of transmitting hydraulic pressure, and when the rivet is to be set a sufficient amount of such pressure is applied to the interior of the rivet to expand the same beyond its yield point, whereby it acquires a permanent set in such expanded condition. The hydraulic pressure may be applied in various ways, but in any case it is necessary that a closure be provided for the opening into the rivet cavity and that an adequate seal be maintained between such closure and the opening during the period of pressure application.

It is an object of the present invention to provide novel and advantageous means and methods for applying the desired degree of pressure through a body of pressure transmitting material to the interior of a rivet of the general class referred to above.

A further object is to provide desirable means and methods for effecting an adequate pressure seal between the closure or pressure applying member and the opening into the cavity or chamber within the rivet.

More generally speaking, it is an object of the invention to provide certain methods of setting hollow rivets which shall be easy to practice, whereby reliable and efficient riveted structures are produced.

In practicing the invention, a rivet of the fluid expansion type hereinabove referred to has at least a portion of its bore adjacent the head end thereof screw threaded for the reception of a closely fitting screw-threaded member by means of or through which the desired pressure is applied to the interior of the rivet through an intervening body of fluid or fluidic material. Such screw-threaded member may be constituted by either an ordinary screw of suitable material which may, if desired, be retained in the completed rivet, or by a screw-threaded tool which may be readily removed after the rivet setting or expanding operation has been completed. Alternatively, a pressure gun or nozzle having a screw-threaded fitting may be screwed into the threaded bore of the rivet and utilized to apply the desired fluid pressure to the interior thereof.

In case a screw or a screw-threaded tool is used to apply the pressure by direct compressive action as such screw or tool is screwed into the bore of the rivet, the rivet chamber is prefilled with a suitable fluidic material in sufficient quantity to effect the desired expansion of the rivet shank when the screw or tool is driven into the rivet to the full depth provided, and the bore of the rivet is screw threaded to a sufficient depth to accommodate that amount of penetration. In case a pressure gun or nozzle with a screw-threaded fitting is to be utilized, the bore of the rivet member may, if desired, be screw threaded to a sufficient depth only to receive such fitting, and the rivet chamber may be prefilled with fluidic material or not, as desired.

The invention will be better understood and other objects and advantages thereof will appear from a consideration of the following detailed description, taken in conjunction with the accompanying drawings, in which Fig. 1 is a sectional view through the axis of one form of rivet embodying the invention, prior to the expansion or setting operation but in readiness therefor, in position in a section of structure to be riveted, the amount of clearance normally provided between such rivets and structures being exaggerated for purposes of better illustration, as hereinafter explained;

Figure 1:
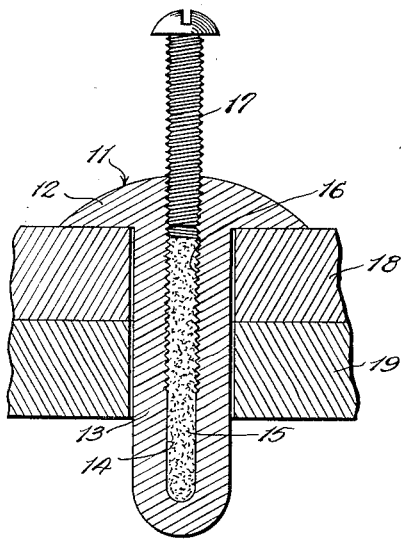
Figure 2:
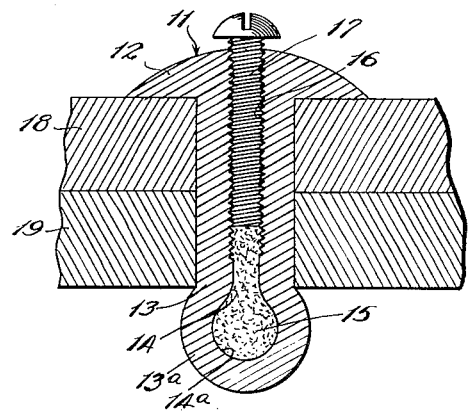
Fig. 2 is a similar view of the same rivet after expansion or setting in the structure to be riveted.

Referring to the drawings, Figs. 1 and 2 show a rivet 11 comprising a head portion 12 and a shank portion 13 having an axial bore 14 opening at the head end of the rivet and extending to a point short of the shank end thereof. A body of fluidic material 15 is disposed within the bore 14, filling the same to a substantial depth. The upper portion of the bore 14 is provided with internal screw threads 16 into which a relatively closely fitting screw 17 enters through the opening at the head end of the rivet.

The rivet 11 is shown in Fig. 1 in position to be expanded or set in a structure to be riveted, consisting of plates or other structural parts 18 and 19. As shown, these parts 18 and 19 have aligned openings therein through which the shank portion 13 of the rivet extends and beyond which the extremity of said shank portion projects a substantial distance. As in usual riveting practice, the openings in the structural parts 18 and 19, through which the rivet shank is to extend, are normally formed to provide a relatively snug fit with the shank of the rivet, but some slight amount of clearance may commonly exist and the amount of such clearance is exaggerated in Fig. 1 for purposes of better illustration of the invention.

Fig. 2 shows the same structure and parts as shown in Fig. 1, but with the rivet 11 expanded or set and the structure consisting of the plates or parts 18 and 19 thereby riveted together. The expanding or setting operation is accomplished by screwing the screw 17 into the screw-threaded bore of the rivet 11, which normally brings the head of the screw 17 into proximity to or to contact with the head 12 of the rivet. This operation exerts pressure upon the body of fluidic material 15 and such pressure is hydraulically transmitted by said body of material to the internal walls of the rivet which define the bore 14 therein. This pressure is sufficient to exceed the yield point of the rivet. The shank portion 13 thereof accordingly expands within the limits permitted.

Such expansion causes the rivet shank to swell sufficiently to fill any clearance between said shank and the openings in the structure through which it extends, so that a tight fit between the rivet shank and the parts to be riveted is secured, this condition being illustrated in Fig. 2. The pressure hydraulically applied to the interior of the end portion of the rivet shank 13, which extends beyond the parts to be riveted, causes said portion to expand or bulge to secure the rivet firmly in the structure and to retain it therein. This condition is also illustrated in Fig. 2, in which the bulged end portion of the rivet shank is designated by the reference character 13a and the correspondingly enlarged extremity of the bore 14 is designated by the reference character 14a.

The rivet 11 may be made of any suitable rivet material, but in any case, of course, such material has the characteristic of taking a permanent set when strained or stretched beyond its yield point. Accordingly, the rivet retains its expanded shape after the same has been set in the manner described above. The diameter of the bore 14 may suitably be equal to about one-third of the diameter of the rivet shank 13, but this ratio is not critical. The shank end of the rivet is preferably, although not necessarily, of initially rounded form, as shown in Fig. 1, with the end of the bore 14 correspondingly rounded in such fashion as to provide uniform or substantially uniform wall thicknesses of the rivet throughout the side and end walls thereof.

The fluidic material 15 may consist of any substance capable of transmitting pressure in the manner described. Suitable substances are machine oil and various other types of oil, paraffin, and in general such substances as possess fluid or flowable plastic characteristics. A substantially incompressible fluid may be used, but a moderate degree of compressibility is not objectionable. Since the material may be either a true fluid or other substance which has pressure transmitting characteristics similar to those of fluids, the material is generally referred to herein as a fluidic material.

As shown in Figs. 1 and 2, the screw threads 16 in the bore of the rivet are extended into said bore to a sufficient depth to accommodate the maximum desired penetration of the screw 17. This screw may be made of any suitable material, but is preferably of metal of relatively high strength so that it may be readily turned, without danger of breakage, to exert the required pressure on the body of fluidic material 15. The screw threads are preferably of relatively low pitch and corresponding fine gauge and the threads on the screw 17 have a close fit with the threads 16 in the bore of the rivet in order to provide and maintain an adequate seal to prevent leakage of the fluidic material 15 when the latter is put under pressure in the rivet-setting operation. The screw 17 may be allowed to remain in the rivet after setting thereof so that the finished riveted structure will appear substantially as shown in Fig. 2, such retention of the screw being preferable for purposes of added shear strength. However, the screw may be removed after the rivet is set, if desired.

During the setting operation, the rivet 11 may be held by any suitable means against turning with the screw 17. The fit between the shank of the rivet and the openings in the structure to be riveted, through which said shank extends, may be made tight enough to prevent such turning, and the axial pressure exerted on the head of the screw by the screwdriver provides increased friction between the underside of the rivet head 12 and the structural surface against which it abuts, so that additional resistance to turning of the rivet is provided.

Either one of these factors or the combination thereof may suffice, but in addition a suitable tool or appliance for holding the rivet against turning may be employed, as, for example, a tube or cylinder surrounding the shank of the screwdriver and having a milled or knurled surface for engaging the rivet head, which may be forced against the head and held against turning when the screw 17 is turned. In any case, the initial expansion of the rivet shank into tight engagement with the walls of the openings in the structure through which it extends will normally provide sufficient friction to prevent turning of the rivet thereafter.

Figure 3:
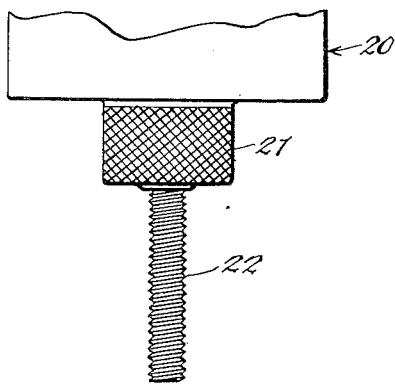
Fig. 3 is a fragmentary elevational view of a tool which may be used in practicing the invention in one form.

If desired, a removable screw-threaded tool may be utilized for setting rivets which are like the one shown in Fig. 1 except for omission of the screw 17. The essential elements of such a tool are illustrated in Fig. 3, wherein said tool is generally designated by the reference character 20. A chuck 21 thereof holds a screw-threaded shank 22 which is screwed into the rivet in lieu of the previously described screw 17 to effect the setting operation.

The tool may be either hand or power operated and may, if desired, be provided with automatic reversing means such as are well known in the art for unscrewing the tool from the rivet after it has entered the same to the desired depth and has thereby completed the expansion or setting operation. In the use of a tool of this character, the end of the shank 22 serves to apply pressure to the body of fluidic material 15 in the rivet in the same manner and with the same results as the screw 17 shown in Figs. 1 and 2. The shank 22 is, of course, designed to have a close fit with the threads 16 in the rivet bore, the same as in the case of using the screw 17.

Figure 4:
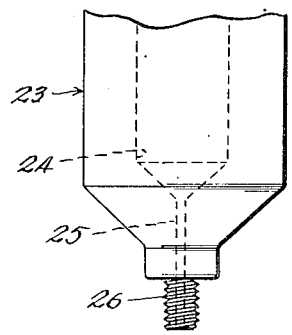
Fig. 4 is a fragmentary elevational view of a hydraulic gun or nozzle which may be used in practicing the invention in another form.

Another mode of practicing the invention resides in the utilization of a pressure gun or nozzle, as illustrated in Fig. 4, wherein the nozzle element of such a device is designated by the reference character 23. A chamber 24 is provided within this element to hold a body of hydraulic fluid or fluidic material which may be put under the required degree of pressure by any suitable means. A passageway 25 extends from the chamber 24 and through a screw-threaded fitting 26, which is utilized to apply the desired pressure to the interior of rivets of the type hereinbefore disclosed, to effect similar setting or expansion thereof. It will be understood, of course, that the fitting 26 will have a close fit with the screw threads in the bore of the rivet adjacent the head end thereof and that the fitting will be screwed into said bore to a sufficient depth to provide an adequate pressure seal against objectionable leakage of the fluidic material.

When the invention is to be practiced in this manner, the screw threads 16 in the rivet bore may be extended to a sufficient depth only to accommodate the fitting 26 in properly sealed engagement and, if desired, the bore in the rivet beyond that depth may be of smaller diameter so that thicker rivet walls are provided. However, this method of pressure application may be utilized equally well with rivets like that shown in Fig. 1, which are therefore alternatively adapted to be expanded by either of the methods hereinbefore described in connection with Figs. 1, 2 and 3.

In case the hydraulic gun or nozzle method of pressure application is to be employed, the rivet chamber or bore may be prefilled or partly prefilled with fluid or fluidic material, or not, as desired, whereas in the case of utilizing either of the methods described in connection with Figs. 1, 2 and 3, such prefilling or partial prefilling is manifestly essential. When the gun or nozzle method is employed, as described in connection with Fig. 4, on rivets which are not prefilled, the required amount of fluid or fluidic material is, of course, supplied from the gun or nozzle during the rivet-setting operation. In such case, the fit between the screw-threaded fitting 26 and the screw-threaded bore of the rivet may be such as to permit the expulsion of air when pressure is applied, but still be sufficiently tight to maintain an adequate seal against objectionable leakage of the fluidic material Rivets which have been expanded or set by either of the methods described in connection with Figs. 3 and 4 may have the head-end openings therein closed by screws or other suitable closures, if desired, or these openings may be allowed to remain unclosed.

From the foregoing it will be seen that this invention provides advantageous means and methods for expanding or setting rivets by utilization of internally applied fluid pressure. While only certain embodiments of the invention have been illustrated and described herein, it will be clear to those skilled in the art that various changes and modifications may be made in the details of construction, arrangement of parts, and mode of carrying out the method steps involved, without departing from the spirit and scope of the invention, as set forth in the appended claims.

What is claimed as new and is desired to secure by Letters Patent therefore is:

1. The method of riveting which comprises providing a rivet having in the shank portion thereof a fluid-tight cavity provided with a single access internally screw-threaded opening, screwing a closely fitting screw-threaded nozzle into said opening to close the same, and setting said rivet by forcing fluidic material into the cavity through said nozzle under sufficient pressure to expand said rivet shank portion beyond its yield point.

2. The method of riveting which comprises providing a rivet having a head and a shank provided with a cavity having a single access opening in the head, said head being provided with means adapted for interengagement with nozzle-securing means, inserting a nozzle provided with securing means in said opening to close the same, temporarily securing the nozzle to the rivet by interengagement of said two means, and thereafter forcing fluid under pressure into the cavity through said nozzle to enlarge the shank in the region of the cavity while thus temporarily secured.

3. The method of riveting which comprises providing a rivet having a head and a shank provided with a cavity having a single access screw-threaded opening in the head, threading a correspondingly screw-threaded nozzle into said opening to close the same and to temporarily secure the nozzle to the rivet, and thereafter forcing fluid under pressure into the cavity through said nozzle to enlarge the shank in the region of the cavity while thus temporarily secured.

HERBERT A. LEBERT.

REFERENCES CITED

The following references are of record in the file of this patent:

UNITED STATES PATENTS

| Number | Name | Date |
|---|---|---|
| Re. 16,062 | Tomkinson | May 5, 1925 |
| 1,646,431 | Tomkinson | Oct. 25, 1927 |

FOREIGN PATENTS

| Number | Country | Date |
|---|---|---|
| 544,257 | Great Britain | Apr. 3, 1942 |
| 689,584 | Germany | Mar. 28, 1940 |